United States Patent [19]
Libert et al.

[11] Patent Number: 5,838,871
[45] Date of Patent: Nov. 17, 1998

[54] DEVICE FOR ORGANIZING OPTICAL FIBER CABLE CONNECTIONS AND OPTICAL CABLE JOINT BOX

[75] Inventors: Jean-François Libert, Pont de Briques; Bruno Daguet, Rueil Malmaison; Romuald Lemaitre, Boulogne sur Mer; François Mesnil, Escalles, all of France

[73] Assignee: Alcatel Submarcom, Clichy, France

[21] Appl. No.: 996,986

[22] Filed: Nov. 10, 1997

Related U.S. Application Data

[63] Continuation of Ser. No. 643,041, May 2, 1996, abandoned.

[30] Foreign Application Priority Data

May 3, 1995 [FR] France ..................... 95 05270

[51] Int. Cl.$^6$ ....................................... G02B 6/36
[52] U.S. Cl. ............................................. 385/135
[58] Field of Search ....................... 385/134, 135

[56] References Cited

U.S. PATENT DOCUMENTS

| | | | |
|---|---|---|---|
| 4,516,830 | 5/1985 | Guazzo | 385/135 |
| 4,619,499 | 10/1986 | Gerber | 385/135 |
| 4,773,729 | 9/1988 | Mignien | 385/135 |
| 5,115,489 | 5/1992 | Norris | 385/135 |
| 5,479,553 | 12/1995 | Daems et al. | 385/135 |
| 5,515,200 | 5/1996 | Delrosso et al. | 385/135 |
| 5,519,804 | 5/1996 | Burek et al. | 385/134 |

FOREIGN PATENT DOCUMENTS

| | | | |
|---|---|---|---|
| 0274060A1 | 7/1988 | European Pat. Off. | 385/135 |
| 0356942A2 | 3/1990 | European Pat. Off. | 385/135 |
| 0434530A1 | 6/1991 | European Pat. Off. | 385/135 |
| 2498766 | 7/1982 | France | 385/135 |
| 4308228C1 | 10/1994 | Germany | 385/135 |
| 1234803 | 9/1989 | Japan | 385/135 |
| 2229545 | 9/1990 | United Kingdom | 385/135 |

*Primary Examiner*—John D. Lee
*Assistant Examiner*—Ellen E. Kang
*Attorney, Agent, or Firm*—Sughrue, Mion, Zinn, Macpeak & Seas, PLLC

[57] ABSTRACT

An optical fiber cable connection organizer device includes a support assembly with lateral accessways for the fibers of the cables, an arrangement for holding splices between the fibers and an arrangement for stowing a surplus length of the jointed fibers. It further includes two sets of magazines for stowing additional slack in the fibers from the two cables. Applications include submarine optical fiber cable joint boxes.

8 Claims, 4 Drawing Sheets

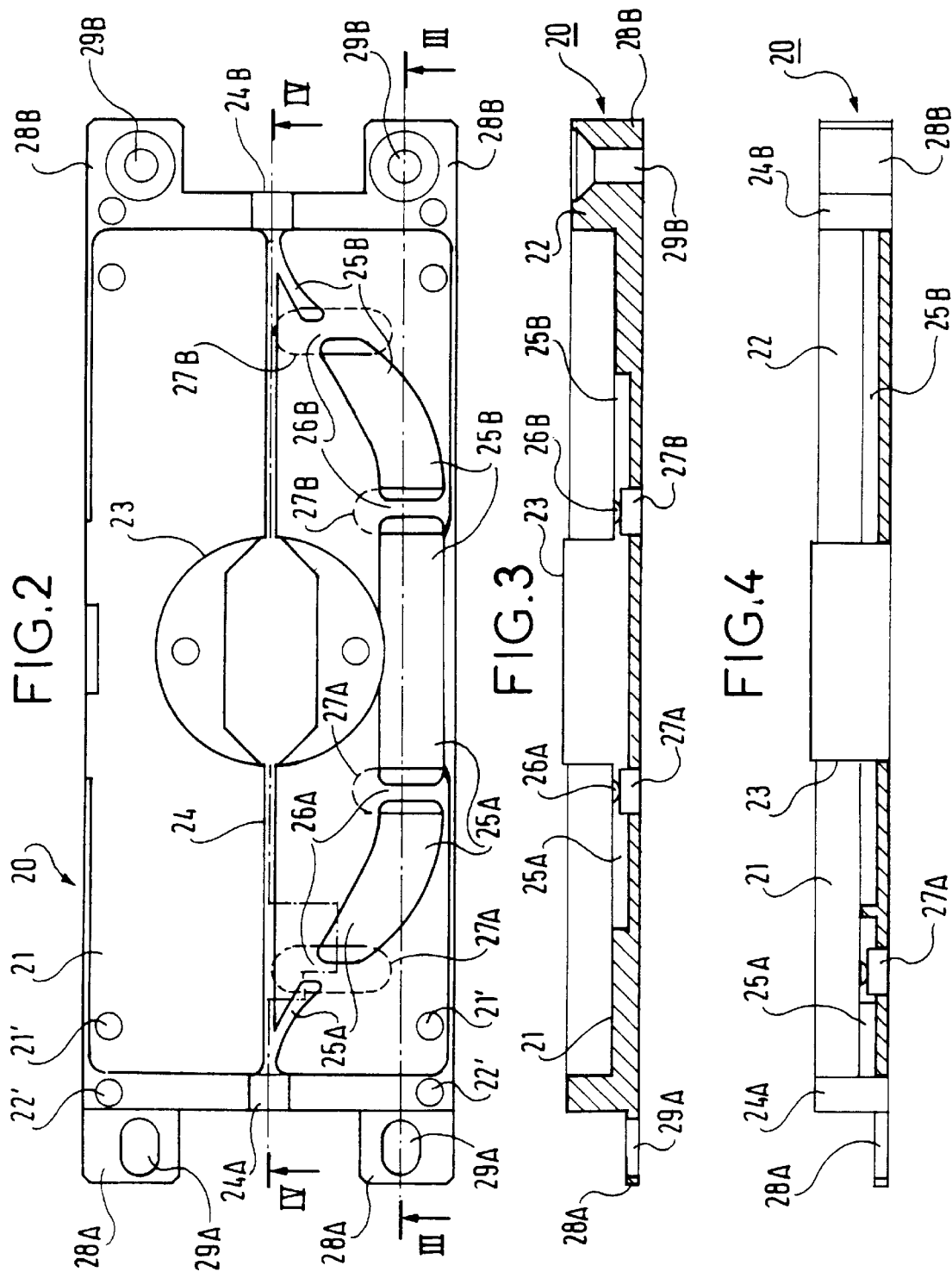

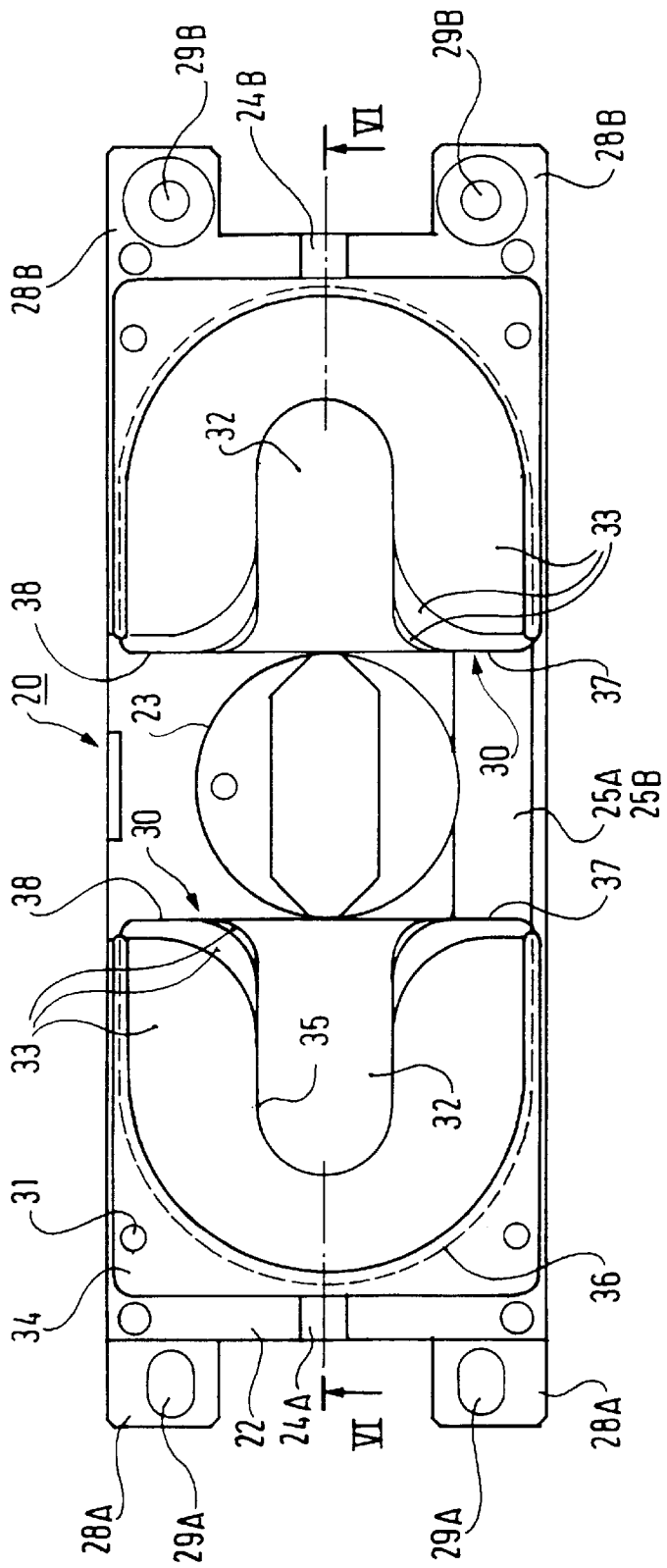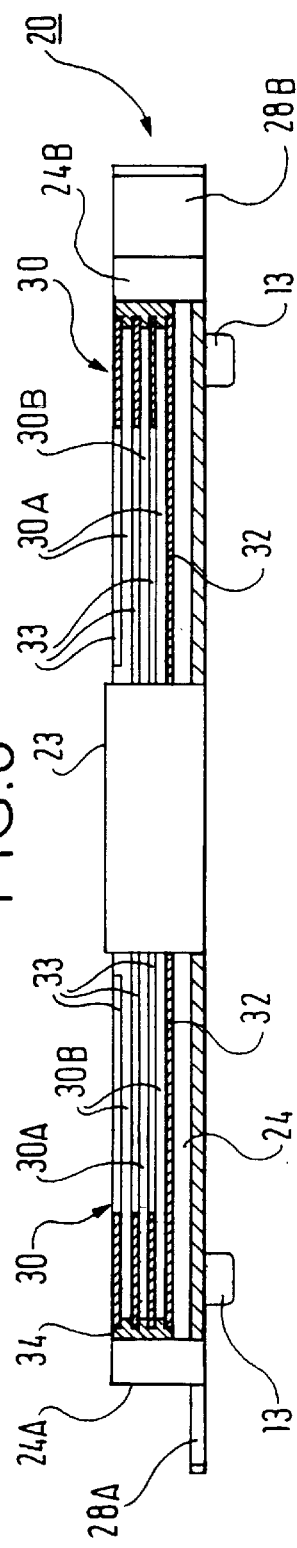

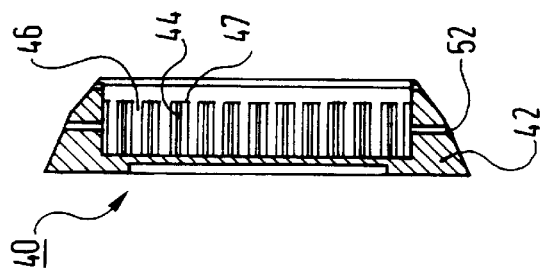
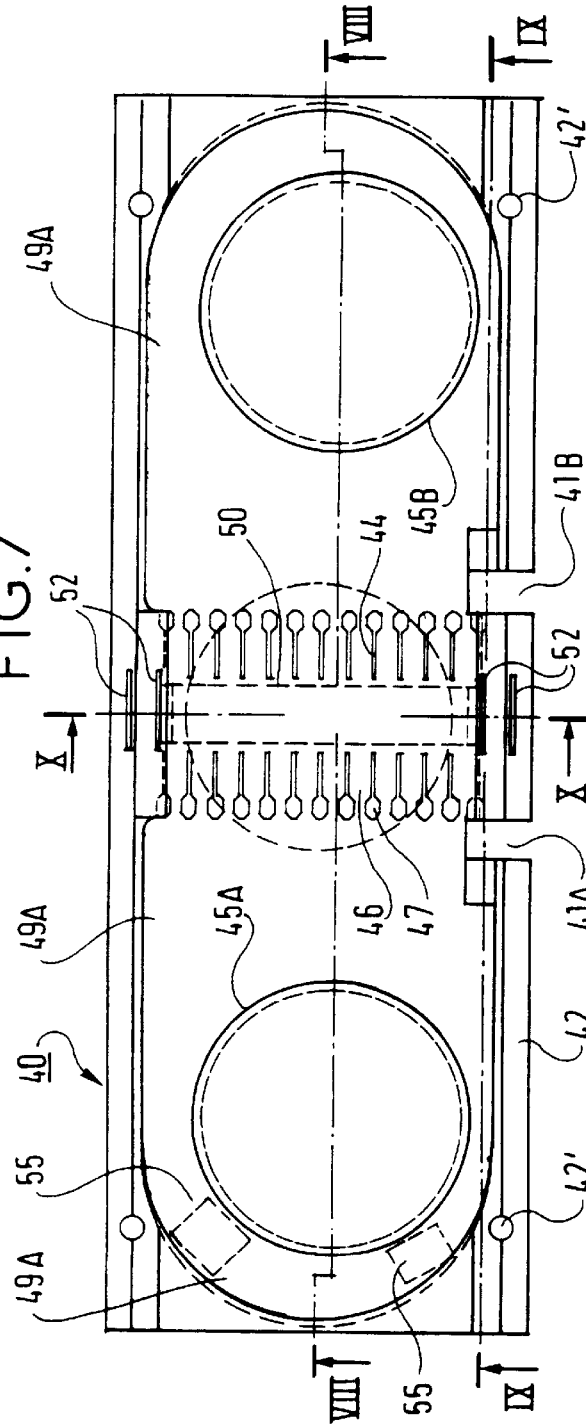
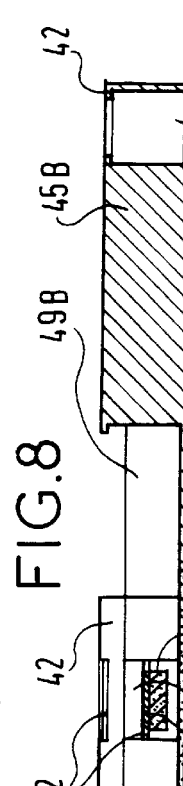
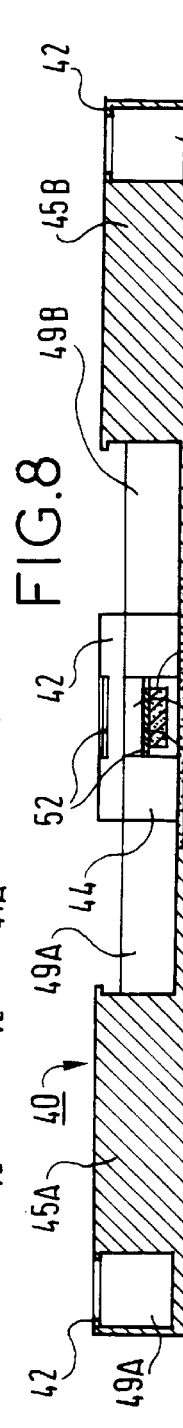
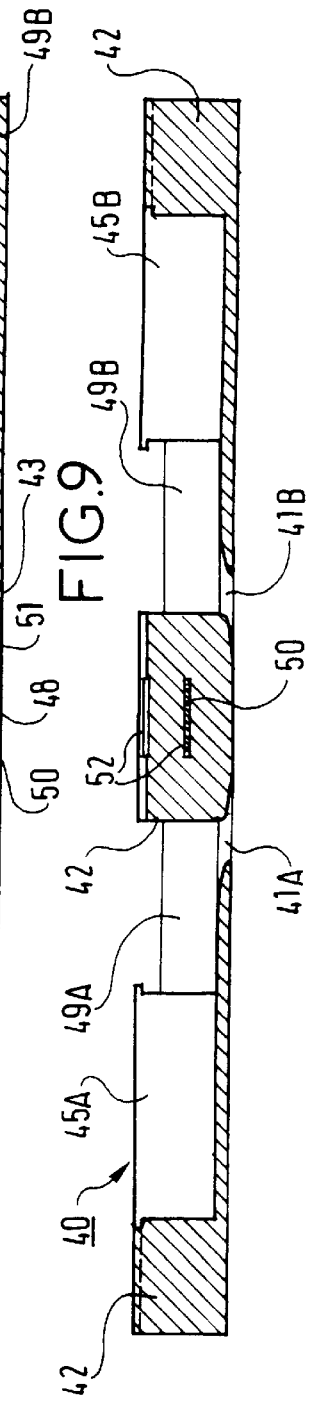

DEVICE FOR ORGANIZING OPTICAL FIBER CABLE CONNECTIONS AND OPTICAL CABLE JOINT BOX

This is a continuation of application Ser. No. 08/643,041 filed May 2, 1996 (abandoned).

BACKGROUND OF THE INVENTION

1. Field of the Invention

The present invention concerns the jointing of optical fiber cables, in particular submarine optical fiber cables. It is more particularly concerned with a device for organizing optical fiber cable connections and an optical cable joint box.

Optical fiber cables usually comprise a set of optical fibers, possibly mounted on a grooved rod or in a protection tube filled with a gel or possibly embedded in a binding polymer with one or more carrier and/or strength members associated with the fibers. Submarine optical cables also include at least one layer of external armoring and electrically conductive remote power feed means, if necessary. Terrestrial optical cables often include wires for tensile strength integrated into or surrounding the optical part. Optical fiber cables are covered with a sheath to protect and possibly insulate them from the seawater.

To joint two optical fiber cables, the set of fibers or the optical part of each cable is freed from the structure of the cable over a certain length of the end portion of the cable so that the fibers of the two cables can be spliced.

2. Description of the Prior Art

Application EP-A-0 274 060 describes a joint box for optical fiber cables, in particular submarine cables. The box includes a container tube with the ends closed by two covers with bores in them and an interior cylindrical tank in which the jointed fibers are stowed. The tank is fixed between the covers. The cables are anchored into the covers and their fibers extend into the tank through a narrow passage provided in each cover. The tank has a wide central opening through which the fibers to be jointed can be extracted and then re-inserted into the tank. Its lower wall, which is cylindrical in the middle part of the tank, ends in a tulip-shape portion to receive the fibers passing through each cover. It also has two annular interior recesses, where each end part joins the middle part of the tank, in which surplus lengths of the jointed fibers are stowed in coils against the bottom of the recesses.

The storage tank does not include any means for holding the splices, which must have good mechanical strength since there is no external reinforcement to protect them and they are loose in the storage tank. The lack of holding means for the splices in the tank is incompatible with mechanical reinforcement of the splices because their weight becomes large in comparison with the stiffness of the fibers. Mechanically reinforced splices are often preferred over unreinforced splices for practical reasons.

Document U.S. Pat. No. 4,840,449 describes a device for organizing the connections between two optical fiber cables. This device includes a rectangular support having on one face a rib along each of its shorter sides, two cylinders onto which the fibers are coiled provided side by side along one of its longer sides and means for holding the splices between the fibers along the other longer side. The two cylinders are spaced from each other and from the rib adjacent each of them. The cables are fixed to the support near the accessways provided for the fibers on the support, the splices between the fibers are effected, the splices are positioned in the holding means and the surplus length of the fibers from the cables is stowed in coils around both the cylinders. The space between each cylinder and the adjacent rib of the support is used to stow loops of varying length, dependent on the surplus length to be stowed.

The loops can allow some slight play or movement of the fibers towards the cable, at least if the first loop is longer than the perimeter of the cylinder. Any such play is very small and may be insufficient, especially when the fibers are more or less loose in the cable structure and traction is applied to the cable.

An object of the present invention is to allow great freedom of movement of the spliced fibers towards the corresponding cable and in a manner that is independent of the surplus length normally allowed for the splices between the fibers and for which stowage means are also provided.

SUMMARY OF THE INVENTION

The present invention is directed to in an optical fiber cable connection organizer device comprising a substantially parallelepiped-shaped support assembly having lateral accessways at two opposite ends for fibers of said cables, first means for retaining splices jointing fibers of said cables, second means for stowing a surplus length at the ends of the jointed fibers and third means for unrestricted storage of an additional slack in the fibers from each cable, the third means coupling said lateral accessways to said second stowage means in said support assembly and including, for the fibers from one of said cables entering via one of said lateral accessways, at least a first individual magazine for stowing a loose coil situated in an end part of said support assembly opposite the lateral accessway for the fibers of the cable concerned and open substantially facing said lateral accessway.

This device also has at least one of the following additional features:

—the third means for stowing the slack further include at least a second individual magazine associated with the first magazine for storing another loose coil situated in the other end part of said support assembly adjoining the lateral accessway for the fibers of the cable concerned and open facing the other lateral accessway and said first magazine, each second magazine associated with each first magazine being at a level offset to said first magazine and to said lateral accessways;

—a central cylinder in the support assembly between the two sets of magazines, the central cylinder delimiting on each side a loose coil entry opening and a loose coil exit opening in each individual magazine and limiting the minimal length of each loose coil;

—the support assembly includes two support plates with the two sets of individual magazines and the central cylinder between them, one of the support plates being a bottom plate incorporating the lateral accessways and grooves for guiding the fibers of the cables substantially tangentially to the periphery of the central cylinder from each lateral accessway;

—the bottom plate has a recess on a top face in which are housed and accommodated two sets of magazines and from which the central cylinder projects.

The invention further consists in a submarine optical cable joint box utilizing the above device and further comprising a container tube mounted on said device and closed by two covers at the ends to which said cables are anchored and support members fixed to an innermost front face of the covers for seating and fixing the device and guiding the fibers of the cables into the lateral accessways of the device.

The features and advantages of the invention will emerge from the following description of one embodiment given by way of example and with reference to the accompanying drawings.

BRIEF DESCRIPTION OF THE DRAWINGS

FIG. 2 is a top view of a bottom plate of the device in its unequipped state.

FIGS. 3 and 4 are views of this plate in section on the lines III—III and IV—IV, respectively, in FIG. 2.

FIG. 5 is a top view of the bottom plate in its equipped state.

FIG. 6 is a view of the equipped plate in section on the line VI—VI in FIG. 5.

FIG. 7 is a top view of a top plate of the device.

FIGS. 8, 9 and 10 are views of the top plate in section on the lines VIII—VIII, IX—IX and X—X, respectively, in FIG. 7.

DETAILED DESCRIPTION OF THE PREFERRED EMBODIMENT

Figure 1:
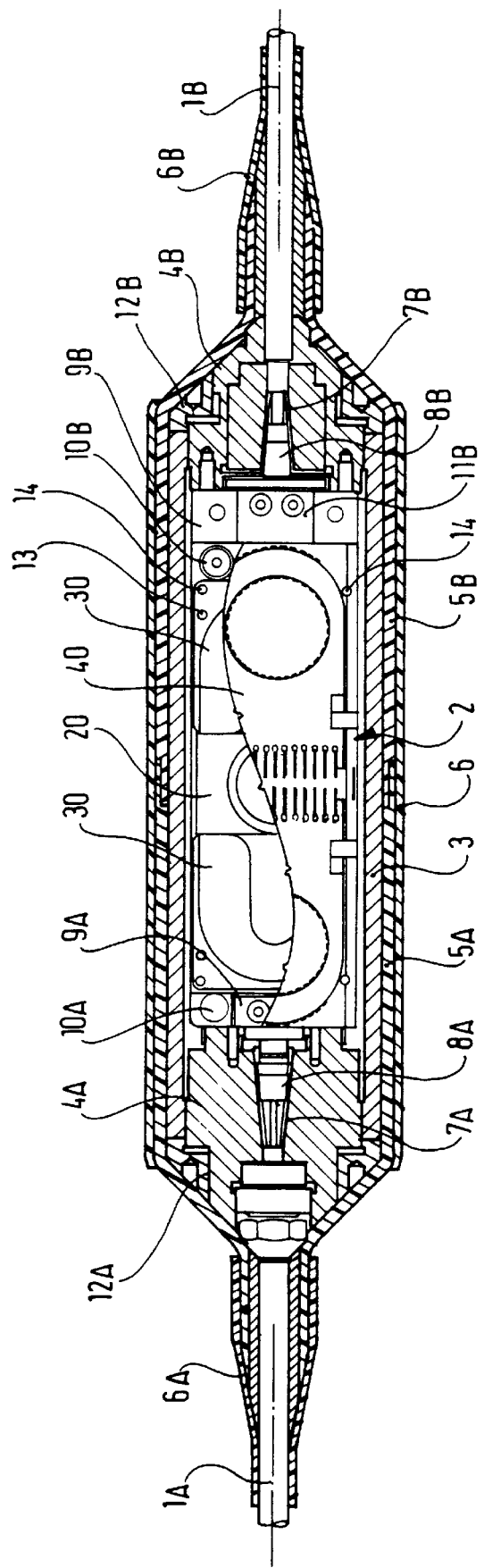
FIG. 1 is a partially cut away sectioned view of a submarine cable joint box equipped with a connection organizer device of the invention.

The joint box shown in FIG. 1 is for jointing two optical fiber submarine cables 1A and 1B. It includes an optical fiber cable connection organizer device 2 held inside a container tube 3 providing mechanical continuity of the jointed cables. The container tube is closed by two covers 4A and 4B to which the cables are anchored and between which the device 2 is held. The container tube and the covers are made of metal. They have an exterior protective coating extending a short way along the cables on each side. In this embodiment this protection is provided by two sheaths 5A and 5B that nest one within the other around the central part of the container tube and associated shrinkable sleeves 6, 6A and 6B providing additional protection, in particular sealing, mounted over the nested sheaths and over their end parts and the cables. Alternatively, this protection can be molded over the container tube and over the cables on each side of it.

The edges of the covers 4A and 4B are screwthreaded and the container tube has an interior thread at each end for attaching them. Each cover has a bore in which one of the cables is received and anchored, this bore being adapted to suit the construction of the cable it receives. Referring to FIG. 1, it can be seen that the cover 4A is in one piece and has at its innermost end inside the container tube a frustoconical bore in which the armor wires 7A of the cable 1A are terminated and immobilized by means of a clamping cone 8A. The cover 4B is in two parts that are abutted together, in which condition they are equivalent to a single part fitted to the cable 1B. The cover 4B has a frustoconical bore in its end part inside the container tube for terminating and immobilizing the armor wires 7B of the cable 1B by means of a clamping cone 8B.

A plurality of cones fitting one inside the other within the bore of the cover are used if the cable has a plurality of layers of armor wires.

The fibers of the corresponding cables pass axially through the cones 8A and 8B and are totally or partially freed from the cable, depending on the structure of its optical part.

Members 9A and 9B fixed to the innermost front face of the covers inside the container tube are generally semiannular in shape and together define a support between the two covers on which the device 1 is seated and to which it is fixed by screws 10A and 10B. The members 9A and 9B have a groove for guiding the fibers into the device 2. They can also anchor the reinforcing members associated with the fibers in the optical part of the cable, if necessary, by means of a stud 11B attached to the central part of the member 9B concerned and fixed by screws on either side of the fiber guide groove between the member 9B and the stud 11B in the device 2.

Two locknuts 12A and 12B are attached and screwed to the faces of the covers 4A and 4B that face out of the container tube. They are screwed in until they abut against the ends of the container tube.

To joint the cables 1A and 1B the locknuts 12A and 12B are threaded over the respective cables and the container tube 3 is threaded over one cable. The cables are stripped and their armor wires are anchored in the covers, with an appropriate length of the fibers passing through the covers.

The fibers are jointed and the surplus lengths are coiled into the device 2 fixed between the covers. The container tube 3 is then moved beyond the first cover by screwing it past the cover and is then screwed simultaneously onto both covers. The locknuts 12A and 12B are moved up against the covers and screwed to them. The protective sheaths 5A and 5B followed by the sleeves 6, 6A and 6B are then fitted, the latter having been placed on the cables ready for this beforehand.

Still referring to FIG. 1, in which the device 2 is shown partially cut away, it can be seen that the device 2 includes a bottom plate 20 for receiving the fibers and stowing slack in the fibers from both cables in magazines 30 and a top plate 40 for stowing the splices and the surplus lengths of the jointed fibers. The magazines 30 are between the plates 20 and 40. They are fixed by screws 13 to the bottom plate 20 and covered by the top plate. Alternatively they can be fixed to the bottom of the top plate. The top plate 40 is fixed by screws 14 to the bottom plate 20.

The connection organizer device 2 is explained firstly with reference to FIGS. 2 through 4 which show the bottom plate 20 in its unequipped state and FIGS. 5 and 6 which show the bottom plate equipped with the magazines 30.

The bottom plate 20 is rectangular in shape and has a wide rectangular recess 21 in its top face. This recess is delimited by a peripheral rim 22 and a central cylinder 23 projects from the bottom of the recess. This cylinder is slightly higher than the peripheral rim 22 and its diameter is less than the width of the plate. The plate 20 is preferably made from aluminum or aluminum alloy.

Two lateral accessways 24A and 24B for the sets of fibers of the two cables are provided through the middle parts of the shorter sides of the peripheral rim 22. They are slightly deeper than the recess 21. Two grooves 25A and 25B are provided in the bottom of the recess to guide the two sets of fibers. They are arcuate in shape and open through a large radius curve into the respective lateral accessways 24A and 24B. They join together and pass tangentially around the cylinder 23, along one of the longer sides of the rim 22. In an alternative arrangement the two guide grooves do not join together but extend around the cylinder along opposite longer sides of the rim 22. Sets of lugs 26A and 26B are provided along the longitudinal opening of the grooves for retaining the set of fibers in each of them. A corresponding opening 27A and 27B is provided through the thickness of the bottom of each groove, under each of these lugs, to facilitate the manufacture of the plate 20.

Two pairs of fixing lugs 28A and 28B are provided at the ends of the plate 20. The lugs 28A at one end of the plate are thin and are level with the bottom of the grooves 25A. They have an oblong hole 29A in them with its longer axis parallel to the longitudinal axis of the plate. The lugs 28B are thicker and have a circular hole 29B in them, the opening at the top end of which is of larger diameter in order to accommodate the head of a screw.

Referring also to FIG. 1, in which the members 9A and 9B fixed to the covers of the container tube of the joint box define the support on which the device 2 is seated, it will be understood that the holes 29B receiving the screws 10B do not allow any play of the plate 20 on the members 9B whereas the holes 23A receiving the screws 10A allow slight play of the plate on the member 9A, along the greater axis of the holes 29A.

The plate 20 also has an axial groove 24 joining the lateral accessways directly and intersecting the central cylinder 23. It also has holes 22' at the ends of the shorter sides of the rim 22 and holes 21' at the four corners of the bottom of the recess 21, the former for fixing the top plate and the latter for fixing the magazines to the bottom plate.

The axial groove 24 is for the central strength member, if any, associated with the set of fibers from the optical part of either cable. A central strength member of this kind is terminated and anchored in the central cylinder 23 by means of attached ancillary members that are not shown. The magazines 30 for storing the slack in the set of fibers from each cable are assembled into two identical sets of magazines. Each set of magazines is attached to and housed in the recess 21, between one of the lateral accessways 24A, 24B and the central cylinder 23. It is mounted on the bottom of the recess and against the corresponding peripheral rim and is fixed in place by means of two screws 13 (FIGS. 1 and 6) received in the holes 21' in the plate 20 and in screwthreaded holes 31 in the set of magazines.

The magazines of each set are defined by parallel plates 32 and 33 with a narrow gap between them attached to a lateral holding member 34. The holding member 34 is generally U-shaped, lying flat in the recess in the plate 20, the width of the branches and the base corresponding to the depth of the recess 21. The inside faces of the branches and the base of the member 34 define a semi-elliptical surface in which the plates 32 and 33 are retained. The outside faces of the branches and the base are flat and pressed against the rim 22 of the plate 20.

The plate 32 is the backing plate of the set of magazines. It is solid and semi-elliptical in shape. The plates 33 each have an axial recess 35, also U-shaped with rounded back and ends, conferring on them an elliptical ring shape. The inside surface of the branches at the base of the holding member 34 incorporates grooves 36 which are superposed and continuous from the end of one of the branches to that of the other branch of this member. These grooves locate the plates 32 and 33 which are fixed, for example glued, to each of them.

The magazines 30 are open on the side facing the cylinder 23. They have an entry opening 37 at the end above the middle part where the guide grooves 25A and 25B join, between the cylinder 23 and the corresponding longer side of the rim. They have an exit opening 38 at the end opposite the cylinder 23.

The individual magazines of each set are defined between two of the plates 32 and 33. They are alternately assigned to stowing considerable slack left in the set of fibers from each of the two cables in the form of a loose coil of variable length in each magazine. This is represented in FIG. 6 by the letters A and B assigned to the magazines, corresponding to the lateral accessway 24A and 24B and according to their rank in the set of magazines. The magazines in each of the two sets are assigned according to their rank in each set and starting from the bottom magazine. The odd ranked magazines in the set situated on the plate 20 opposite the lateral accessway concerned and the even ranked magazines in the other set are all assigned to stowing the slack in the set of fibers entering via that accessway. Thus the magazines 30A are assigned to the fibers entering via the accessway 24A and the magazines 30B to the fibers entering via the accessway 24B. The first of the magazines 30A to be used to stow the set of fibers from the accessway 24A is the bottom magazine in the set facing that accessway, the second to be used is the second magazine from the other set and the third to be used is the third magazine from the first set. A comparable scheme applies to the magazines 20B assigned to the set of fibers from the accessway 24B. The number of magazines in each set is chosen to store a maximal length of slack. This number is 3 in the present embodiment, but could be greater than 3.

Stowing the slack in the set of fibers from each cable enables the fibers to move towards the cable when the latter is loaded in traction and the set of fibers is loose within the cable structure. Under these conditions, the loops in the magazines are successively tightened around the central cylinder 23 with the result that the set of fibers is not stressed when the cable is loaded in traction. The diameter of the cylinder 23 is naturally chosen so that the radius of curvature of the fibers around the cylinder is acceptable.

The top plate 40 of the device for organizing the connections between two optical fiber cables is described with particular reference to FIGS. 7 through 10. Its attachment to the bottom plate is further explained with reference to FIGS. 1, 5 and 6 in particular.

The plate 40 is rectangular in shape and covers the bottom plate. It has two notches 41A and 41B on opposite sides of a middle portion of one of its two longer edges, through which pass fibers from the top magazines 30A and 30B used. Its top face is recessed and has a peripheral rim 42 interrupted by the notches 41A, 41B. It is fixed to the bottom plate 20 equipped with its two sets of magazines 30 by four screws 14 received in the holes 22' in the bottom plate and in corresponding screwthreaded holes 42' through the top plate, in its rim 42. Location of the plate 40 on the plate 20 is facilitated by a circular imprint 43 provided on its bottom face to receive the end of the central cylinder 23 on the bottom plate.

The plate 40 has projecting ribs 44 in the middle part of its notched top face and two projecting lateral cylinders 45A and 45B on opposite sides of the ribs.

The ribs 44 are parallel to the longer sides of the plate and define between them and the longer sides of the rim 42 grooves 46 for retaining splices between the fibers. Bosses 47 at the ends of the ribs and in corresponding relationship thereto on the longer sides of the rim project into the grooves to wedge the splices. The grooves are discontinuous, being divided into two sets defining a central housing between the two sets of grooves. This housing receives a removable plate 50 for holding the splices against the bottom of the grooves. The plate 50 advantageously carries a foam pad 51 on the side pressed against the splices. It locks into two facing slots 52 in the longer sides of the rim 42. There are advantageously two such slots 52 on each rim, to define two levels at which the plate 50 is secured over the splices in the grooves, e.g. for a single splice or two superposed splices in each groove.

To make the drawings clearer the fibers and the splices between them are not shown. Suffice to say that the splices are protected for increased strength.

The two cylinders 45A, 45B are for stowing surplus lengths of the two sets of jointed fibers, these surplus lengths being totally independent of the slack provided in each set of fibers from the cables, which are already stowed in the magazines. They correspond to a peripheral space 49A or 49B around each of them delimited by the ribs and by the adjoining part of the rim 42, the shorter side of which is semi-circular on the inside. Each space communicates through one of the notches 42A and 42B with the equipped bottom plate.

Foam blocks 55 shown in dashed outline are wedged elastically between the rim 42 and each lateral cylinder 45A or 45B to hold the coils of fibers stowed in the space around each of these cylinders.

Note that the longer sides of the rim 12 are beveled on the outside so that they do not impede sliding of the container tube over the organizer device 2 (FIG. 1).

In the submarine optical cable joint box shown in FIG. 1 the container tube protects the connection organizer device 2. For terrestrial link optical cables the organizer device 2 is protected by a cover covering the top plate. As an alternative to this, the top plate can form a cover which preferably has its bottom face provided with the splice retaining grooves and the lateral cylinders for stowing excess lengths of the jointed fibers, and the top plate (cover) is assembled to the bottom plate, without requiring the notches that communicate with the equipped bottom plate.

This optical fiber cable connection organizer device is suitable for cables with various structures which can cause movement of the sets of fibers when they are mechanically loaded in traction. It enables a considerable slack in the set of fibers from the cables to be stowed, independently of a surplus length provided for splicing the fibers and stored separately from this slack. It prevents any tangling of the loose coils providing the slack with each other and with the coils stowing the surplus lengths provided for the splices The splices between the fibers are advantageously provided with exterior reinforcing protection and are thereby held in the device.

There is claimed:

1. An optical fiber cable connection organizer device comprising:

a substantially parallelepiped-shaped support assembly having lateral accessways at first and second ends for fibers of the cables;

first means for retaining splices jointing the fibers of the cables;

second means for stowing a surplus length at ends of the jointed fibers; and third means for unrestricted storage of an additional slack in the fibers from each cable, said third means coupling said lateral accessways to said second means in said support assembly and comprising a stowing assembly having at least a first stowing level for the additional slack in the fibers from the cables entering via said accessways, said first stowing level including a first magazine situated in a first end part of said support assembly opposite said second end and open substantially facing the accessway at said second end, for stowing a loose coil of the additional slack in fibers entering from the accessway at said second end, and a second magazine situated in a second end part of said support assembly opposite said first end and open substantially facing the first magazine and the accessway at said first end, for stowing a loose coil of the additional slack in fibers entering from the accessway at said first end.

2. An organizer device as recited in claim 1, wherein said stowing assembly comprises a plurality of stowing levels and includes two sets of magazines situated in said first end part and second end part of said support assembly, respectively, and open substantially facing each other from one set to the other, said sets of magazines including said first and second magazines of the first stowing level and additional magazines similar to said first and second magazines and stacked thereon in successive ranks therewith, for stowing successive loose coils of additional slack in fibers from each accessway in the magazines belonging alternatively to one and the other set and having successive ranks in said sets, starting with said first magazine for the fibers from the accessway at the second end part and said second magazine for the fibers from the accessway at the first end part.

3. An organizer device as recited in claim 2, further comprising a central cylinder in said support assembly between said two sets of individual magazines, said central cylinder delimiting a loose coil entry opening and a loose coil exit opening for each individual magazine and limiting a minimum length of each loose coil.

4. An organizer device as recited in claim 3, wherein said support assembly comprises two support plates, said two sets of individual magazines and said central cylinder being disposed between said two support plates, wherein one of said two support plates is a bottom plate which includes said lateral accessways and grooves for guiding the fibers of the cables substantially tangentially to a periphery of said central cylinder from said lateral accessways.

5. An organizer device as recited in claim 4, wherein said bottom plate has a recess which houses and accommodates said two sets of individual magazines, said central cylinder projecting from said recess.

6. An organizer device as recited in claim 5, wherein the other one of said two support plates has a recess in which said first means and said second means are disposed, said first means comprising a series of parallel ribs projecting from a central part of the recess for retaining the splices between said ribs, and said second means comprising two cylinders projecting from the recess on opposite sides of said series of ribs.

7. An organizer device as recited in claim 6, wherein said ribs are discontinuous and comprise two facing sets of ribs that are separated from each other by a housing, said device further comprising a removable plate in said housing for retaining said splices in place between said ribs.

8. A submarine optical cable joint box containing said organizer device as claimed in claim 1, said joint box comprising a container tube in which said organizer device is mounted, said container tube being closed by two covers disposed at opposite ends of said container tube, the cables being anchored to said two covers, said joint box further comprising support members fixed to said covers for seating and fixing said organizer device in said joint box and for guiding the fibers of the cables into said lateral accessways of said organizer device.

* * * * *